United States Patent

Toyoda et al.

Patent Number: 6,050,107
Date of Patent: Apr. 18, 2000

[54] METHOD OF FORMING BARRIER RIBS FOR DISPLAY PANELS

[75] Inventors: Osamu Toyoda; Keiichi Betsui; Akira Tokai, all of Kawasaki; Hironobu Kawano, Satsuma-gun, all of Japan

[73] Assignee: Fujitsu Limited, Kawasaki, Japan

[21] Appl. No.: 09/088,679

[22] Filed: Jun. 2, 1998

[30] Foreign Application Priority Data

Dec. 25, 1997 [JP] Japan .................................. 9-356909

[51] Int. Cl.$^7$ .................................................. C03B 19/06
[52] U.S. Cl. ................................ 65/17.6; 65/60.8; 65/61
[58] Field of Search .................................. 65/17.3, 17.6, 65/42, 43, 59.5, 60.2, 60.8, 61; 445/24

[56] References Cited

U.S. PATENT DOCUMENTS

| | | | |
|---|---|---|---|
| 4,054,435 | 10/1977 | Sakane et al. | 65/17.5 |
| 4,840,654 | 6/1989 | Pryor | 65/17.6 |
| 4,975,104 | 12/1990 | Kim | 65/17.6 |
| 5,032,158 | 7/1991 | Kawasaki et al. | 65/17.6 |
| 5,061,308 | 10/1991 | Murakami et al. | 65/17.6 |
| 5,674,634 | 10/1997 | Wang et al. | 428/688 |
| 5,723,945 | 3/1998 | Schermerhorn | 313/581 |
| 5,739,180 | 4/1998 | Taylor-Smith | 523/203 |
| 5,754,171 | 5/1998 | Stoller | 345/205 |
| 5,793,158 | 8/1998 | Wedding, Sr. | 313/493 |
| 5,828,356 | 10/1998 | Stoller | 345/60 |
| 5,834,896 | 11/1998 | Hayashi et al. | 313/585 |
| 5,835,446 | 12/1998 | Carre et al. | 65/17.3 |
| 5,914,562 | 6/1999 | Khan et al. | 313/582 |
| 5,925,262 | 7/1999 | Choi et al. | 216/24 |
| 5,967,871 | 10/1999 | Kaake et al. | 445/24 |

FOREIGN PATENT DOCUMENTS 8-255510  10/1996  Japan .

*Primary Examiner*—Sean Vincent
*Attorney, Agent, or Firm*—Staas & Halsey LLP

[57] ABSTRACT

A method of forming barrier ribs for a display panel, comprising the steps of: forming a glass layer for an underlying layer having a first low-melting glass powder with a softening point of a temperature A dispersed in a vehicle, and a glass layer for a barrier-rib layer having a second low-melting glass powder with a softening point of a temperature B2 higher than the temperature A and a third low-melting glass powder with a softening point of a temperature B1 higher than the temperature A but lower than the temperature B2 dispersed in a vehicle, on a substrate in this order; heating up to sinter the glass layer for the underlying layer and the glass layer for the barrier-rib layer at a temperature Z higher than the temperature A but lower than the temperature B2, thereby burning out the vehicles therefrom, forming a carve-resistive underlying layer and a barrier-rib material layer easy to carve; forming a mask for carving in a pattern corresponding in plan to barrier ribs on the barrier-rib material layer, carving part of the barrier-rib material layer by a sand blasting method, and thereby forming barrier ribs for dividing a display area.

11 Claims, 7 Drawing Sheets

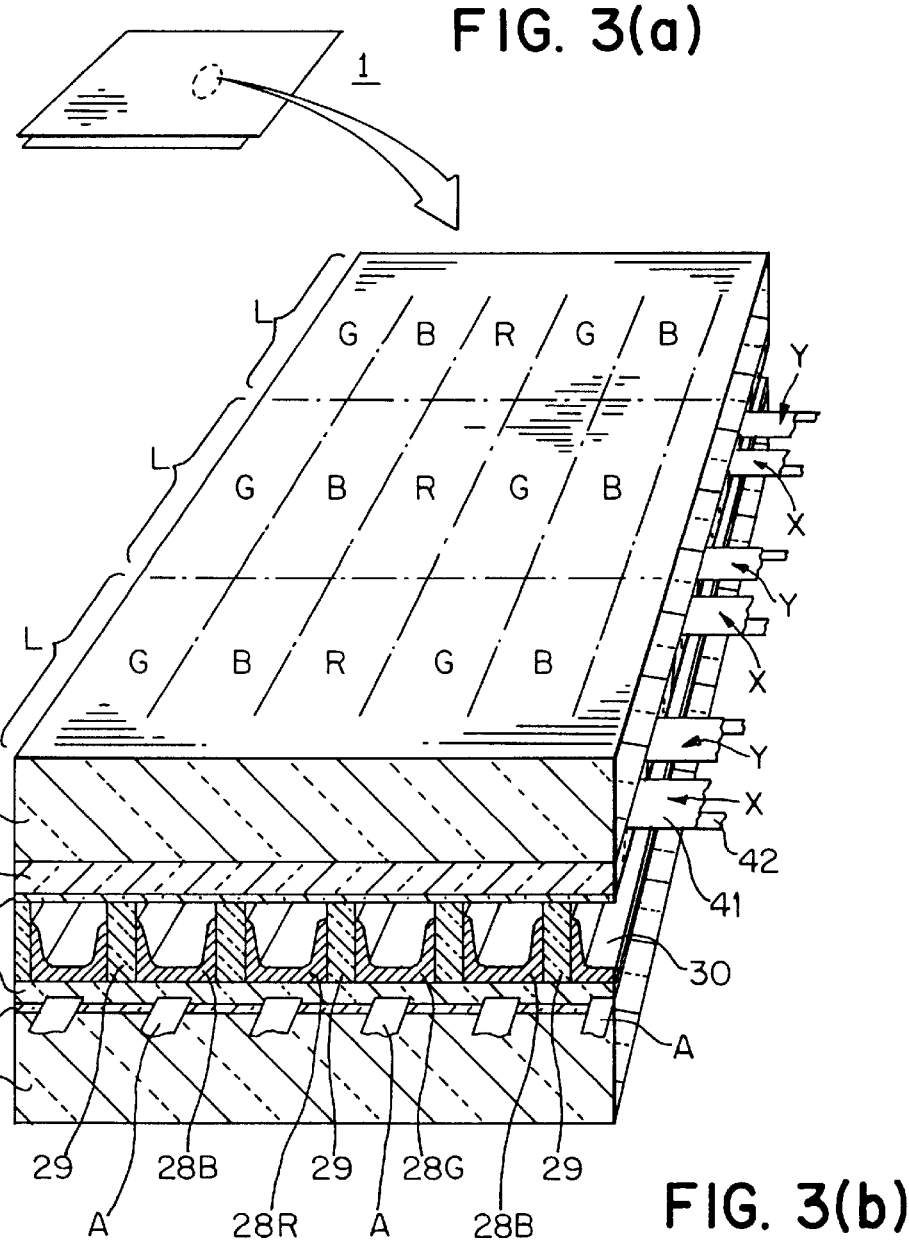

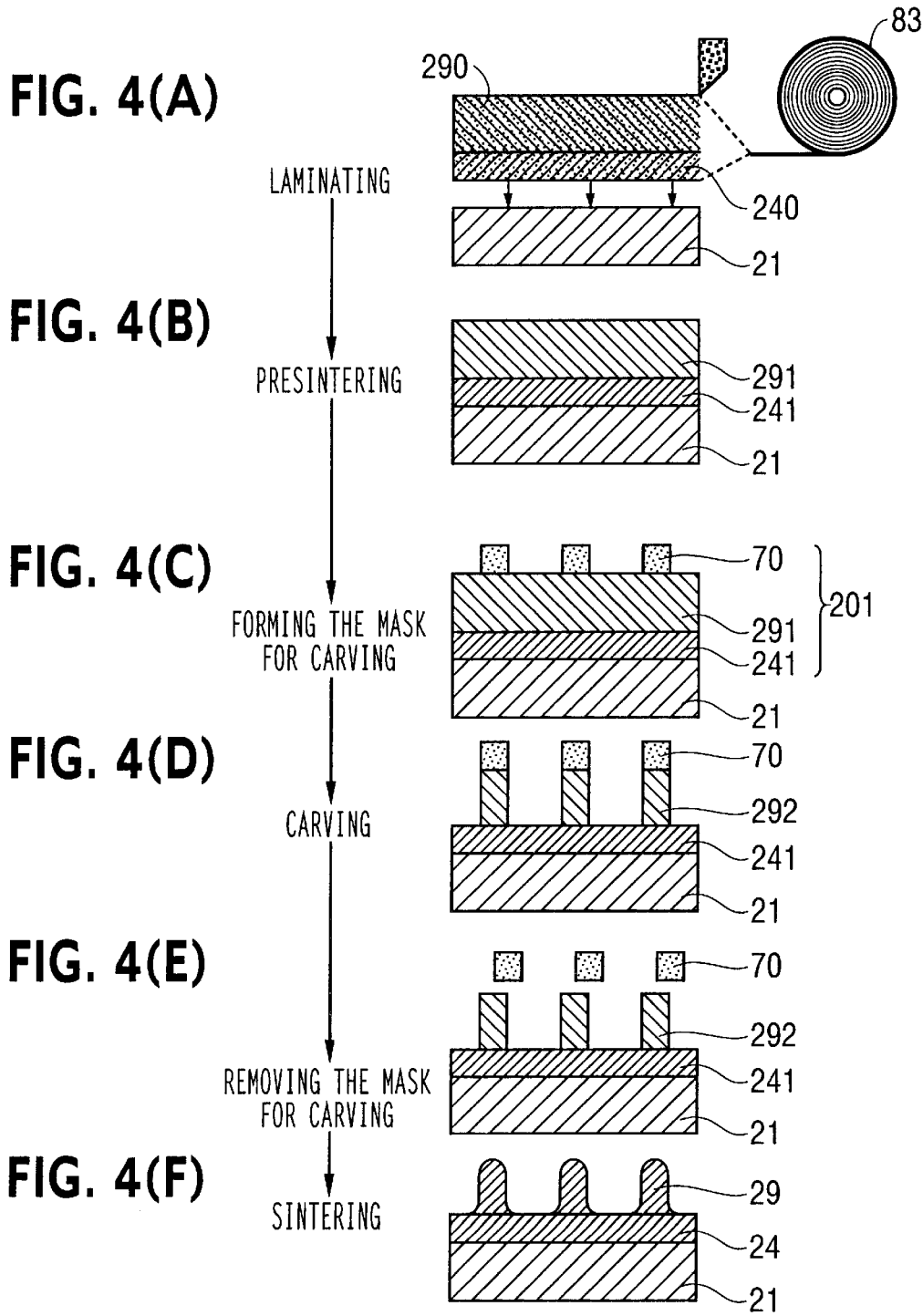

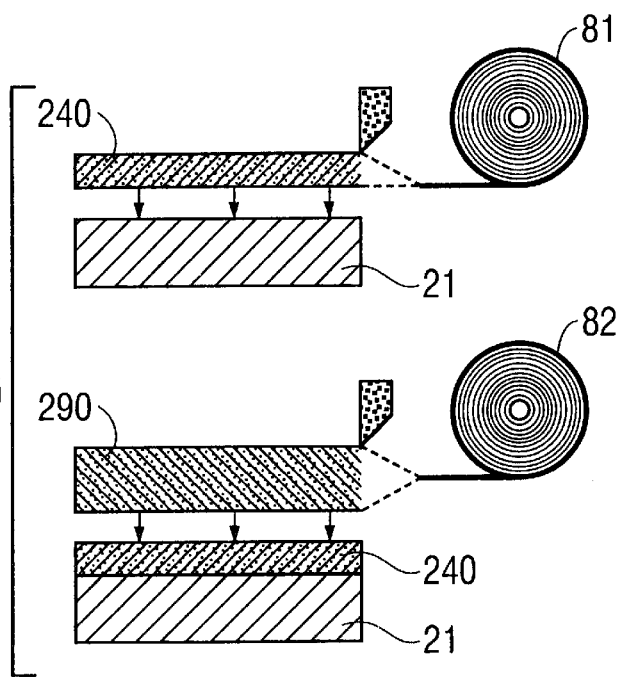

FIG. 6(A) LAMINATING
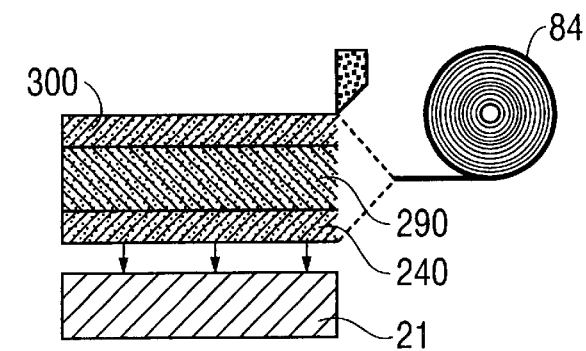
FIG. 6(B) PRESINTERING
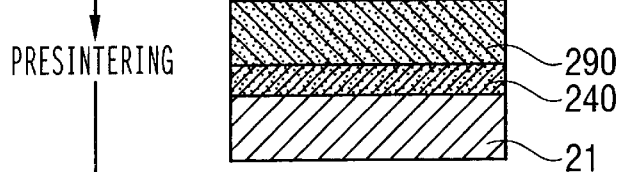
FIG. 6(C) FORMING THE MASK FOR CARVING
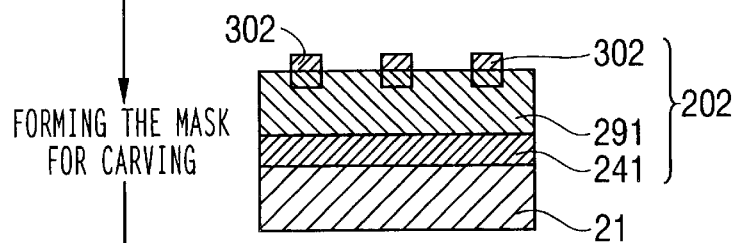
FIG. 6(D) CARVING
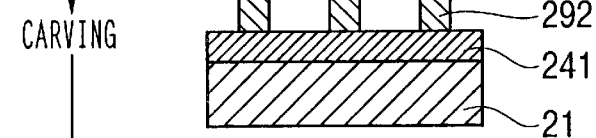
FIG. 6(E) SINTERING
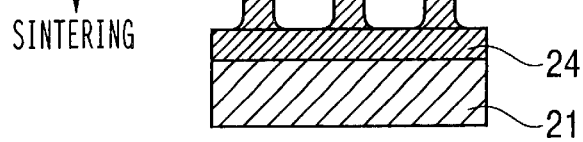

FIG. 7(b) LAMINATING

LAMINATING

FORMING THE MASK FOR CARVING

METHOD OF FORMING BARRIER RIBS FOR DISPLAY PANELS

CROSS-REFERENCE TO RELATED APPLICATIONS

This application is related to Japanese application No. HEI9(1997)-356909, filed on Dec. 25, 1997 whose priority is claimed under 35 USC §119, the disclosure of which is incorporated by reference in its entirety.

BACKGROUND OF THE INVENTION

1. Field of the Invention

The present invention relates to a method of forming barrier ribs for manufacturing display panels, such as PDPs (Plasma Display Panel) and PALCs (Plasma Address Liquid Crystal), having barrier ribs for dividing a display area thereof, and to a green sheet or green tape therefor.

PDPs are characterized by excellent visibility and ability to display at high speeds, and are attracting attentions toward high quality TV (high-vision). Toward broadening PDP applications, the manufacturing technologies are being developed for adaptation for higher precision and larger screen displays.

2. Related Arts

The surface-discharge PDPs, under marketing as color-display devices, have barrier ribs for each column to define an interior discharge space of a matrix display. The barrier ribs serve to prevent discharge coupling and cross-talk in color representation from occurring between adjacent columns. The barrier ribs like this are made of a low-melting glass through the manufacture process of providing a predetermined pattern of a barrier-rib material layer on a substrate and sintering the substrate thus processed at a temperature of 400° C. to 600° C. and around.

In recent years, a sand blasting technique adapted for higher precision is broadly utilized in place of the screen-printing method, to form a predetermined pattern of the barrier-rib material layer. In this method, a low-melting glass paste is first printed over an entire surface of the substrate instead of a barrier-rib pattern, or a green tape or green sheet is adhered thereto in a manner disclosed in Japanese Unexamined Patent Publication No. Hei 8 (1996)-255510, thereby providing the barrier-rib material layer on the substrate. On the barrier-rib material layer, a mask for carving is then made of a photosensitive resist by using a well-known photolithography technique. Then a polisher is applied by blasting to carve portions (unmasked portions) of the barrier-rib material layer uncovered with the mask for carving. After carving, the mask for carving is removed by swelling treatment or the like before a sintering process.

Meanwhile, where forming barrier ribs by the sand blasting method, it is possible to prevent against excessively carving the barrier-rib material layer in a depth direction by providing a low-melting glass layer as an underlying layer of the barrier-rib material layer to be carved in a manner giving a carve rate lower than that of the barrier-rib material layer. In particular, when barrier ribs are formed after arranging electrodes on the substrate, the underlying layer has a role to protect the electrode thus formed. Also, there may be a case that the underlying layer functions as a dielectric layer to provide a desired electric characteristics, thus constituting an essential structural element.

Conventionally, the carve-resistive underlying layer has been formed through printing and sintering a low-meting glass paste applied over the entire surface. After forming the underlying layer, barrier ribs are formed, as mentioned above, through the process of forming the barrier-rib material layer, forming the mask for carving, performing sand blasting, removal of the mask for carving, and sintering.

In the conventional method of forming barrier-ribs, however, there has encountered a difficulty in giving an even thickness of the barrier-rib material layer throughout the display area upon printing a paste over the entire surface. Also, there has been a necessity of several times repetition of printing layers one over another in order to increase the thickness up to approximately 200 $\mu$m, thus raising another problem of increasing the number of process steps. On the other hand, it is possible for a lamination method including a process of adhering the green sheet to form an even thickness of the barrier-rib material layer, requiring only several seconds of adhering operating time. However, the green sheet contains organic ingredients, such as a binder and a plasticizer, and is hence difficult to be carved in an adhered state as it is. That is, there is a necessity of burning out the organic ingredient so as to change the material into a readily-carvable quality after adhesion of the material. This requires a sintering process also in forming the barrier-rib material layer, in addition to the sintering for forming the underlying layer and the sintering after the carve process. Thus, the barrier-rib formation requires totally three times of sintering processes. It requires at least several hours for sintering, and further several hours if a cooling time period is included. Thus, there has been a problem that a greatly increased total time is required to form barrier ribs when adopting the lamination technique. The increase in number of times of sintering is not preferred from the viewpoint of PDP thermal profiles.

In addition, the conventional method involves another problem that, during removing the mask for carving made of the photosensitive resist material, the barrier-rib material layer tends to be chipped during stripping the swelled mask for carving from the patterned barrier-rib material layer. It can be considered to burn out the mask for carving during sintering the barrier-rib material layer without stripping away the mask for carving. However, this raises a difficulty in selecting a material for the mask for carving, because the material has to fulfill the condition such that the material is completely burnt out by the sintering process.

SUMMARY OF THE INVENTION

It is a primary object of the preset invention to shorten a total time required to form barrier ribs on a carve-resistive underlying layer by a sand blasting method.

It is another object of the present invention to eliminate the removal of a mask for carving to prevent the barrier ribs from being chipped.

According to the present invention, there is provided a method of forming barrier ribs for a display panel, comprising the steps of: forming a glass layer for an underlying layer having a first low-melting glass powder with a softening point of a temperature A dispersed in a vehicle, and a glass layer for a barrier-rib layer having a second low-melting glass powder with a softening point of a temperature B2 higher than the temperature A and a third low-melting glass powder with a softening point of a temperature B1 higher than the temperature A but lower than the temperature B2 dispersed in a vehicle, on a substrate in this order; heating up to sinter the glass layer for the underlying layer and the glass layer for the barrier-rib layer at a temperature Z higher than the temperature A but lower than the temperature B2, thereby burning out the vehicles therefrom, forming a carve-resistive underlying layer and a barrier-rib material layer easy to carve; forming a mask for carving in a pattern corresponding in plan to barrier ribs on the barrier-rib material layer, carving part of the barrier-rib material layer by a sand blasting method, and thereby forming barrier ribs for dividing a display area.

According to the present invention, the glass layer for the underlying layer and the glass layer for the barrier-rib layer may be provided by adhering a green sheet onto the substrate.

According to the present invention, the glass layer for the underlying layer and the glass layer for the barrier-rib layer may be simultaneously provided by adhering a multi-layer structure of a green sheet onto the substrate.

According to the present invention, there is provided a method of forming barrier ribs for a display panel, comprising the steps of: forming a glass layer for an underlying layer having a first low-melting glass powder with a softening point of a temperature A dispersed in a vehicle, a glass layer for a barrier-rib layer having a second low-melting glass powder with a softening point of a temperature B2 higher than the temperature A and a third low-melting glass powder with a softening point of a temperature B1 higher than the temperature A but lower than the temperature B2 dispersed in a vehicle, and a material layer for a mask formed in a pattern corresponding in plan to barrier ribs and having a forth low-melting glass powder with a softening point of a temperature C lower than the temperature B1 dispersed in a vehicle, on a substrate in this order; heating up to sinter on the glass layer for the underlying layer, the glass layer for the barrier-rib layer and the material layer for the mask at a temperature Z higher than both the temperature A and the temperature C but lower than the temperature B2, thereby burning out the vehicles therefrom, forming a carve-resistive underlying layer, a barrier-rib material layer easy to carve and a mask for carving; carving part of the barrier-rib material layer by a sand blasting method, and thereby forming barrier ribs for dividing a display area.

According to the present invention, a content of the second low-melting glass powder in the glass layer for the barrier-rib layer may be higher than that of the third low-melting glass powder.

According to the present invention, the material layer for the mask is formed by providing a material for making the material layer for the mask on the glass layer for the barrier-rib layer, thereby forming a mask-forming layer, and then removing part of the mask-forming layer by a photolithography method.

According to the present invention, the glass layer for the underlying layer, the glass layer for the barrier-rib layer and the mask-forming layer may be formed on the substrate by sticking a sheet-formed material including materials forming respective layers thereof.

According to the present invention, the glass layer for the barrier-rib layer and the mask-forming layer may be simultaneously formed on the substrate by adhering a layered-structure of a green sheet including materials forming the respective layers.

According to the present invention, the glass layer for the underlying layer, the glass layer for the barrier-rib layer and the mask-forming layer may be simultaneously formed on the substrate by adhering a layered-structure of a green sheet including materials forming the respective layers.

According to the present invention, there is provided a green sheet, comprising: a glass layer for an underlying layer having a first low-melting glass powder with a softening point of a temperature A or lower dispersed therein, and a glass layer for a barrier-rib layer having a second low-melting glass powder with a softening point higher than a temperature B2 higher than the temperature A and a third low-melting glass powder with a softening point of a temperature B1 higher than the temperature A but lower than the temperature B2 dispersed therein.

According to the present invention, there is provided a green sheet, comprising: a glass layer for a barrier-rib layer having a low-melting glass powder with a softening point of a temperature B1 or lower and a low-melting glass powder with a softening point of a temperature B2 higher than the temperature B1 dispersed therein, and a mask-forming layer having a low-melting glass powder with a softening point of a temperature C lower than the temperature B1 dispersed therein.

According to the present invention, there is provided a green sheet, comprising: a glass layer for an underling layer having a first low-melting glass powder with a softening point of a temperature A or lower dispersed therein, a glass layer for a barrier-rib layer having a second low-melting glass powder with a softening point higher than a temperature B2 higher than the temperature A and a third low-melting glass powder with a softening point of a temperature B1 higher than the temperature A but lower than the temperature B2 dispersed therein, and a material layer for a mask having a fourth low-melting glass powder with a softening point of a temperature C lower than the temperature B1 dispersed therein.

According to the present invention, a content of the second low-melting glass powder may be higher than that of the third low-melting glass powder in the glass layer for the barrier-rib layer.

According to the invention, the material layer for the mask may be formed by providing the glass layer for the underlying layer and the glass layer for the barrier-rib layer on the substrate, and then applying a mask-forming dispersed with a fourth low-melting glass powder with a softening point of a temperature C lower than the temperature B1 in the pattern of plan onto the glass layer for the barrier-rib layer.

BRIEF DESCRIPTION OF THE DRAWINGS

FIGS. 3(a) and 3(b) are exploded perspective views showing an internal structure of a PDP;

FIGS. 4(A), 4(B), 4(C), 4(D), 4(E) and to 4(F) are process views for forming barrier ribs of Example 1;

FIGS. 5(a) and 5(b) are views showing a modification of a lamination process of FIGS. 4(A)–4(F);

FIGS. 6(A), 6(B), 6(C), 6(D) and to 6(E) are process views for forming barrier ribs of Example 2;

FIGS. 7(a) and 7(b) are views showing a modification of a lamination process of FIGS. 6(A) to 6(E)

DETAILED DESCRIPTION OF THE PREFERRED EMBODIMENTS

The present invention uses low-melting glasses having particular softening characteristics to form an underlying layer and a barrier-rib material layer. Also, a mask for carving is made of a low-melting glass having a particular softening characteristics.

Figure 1A:
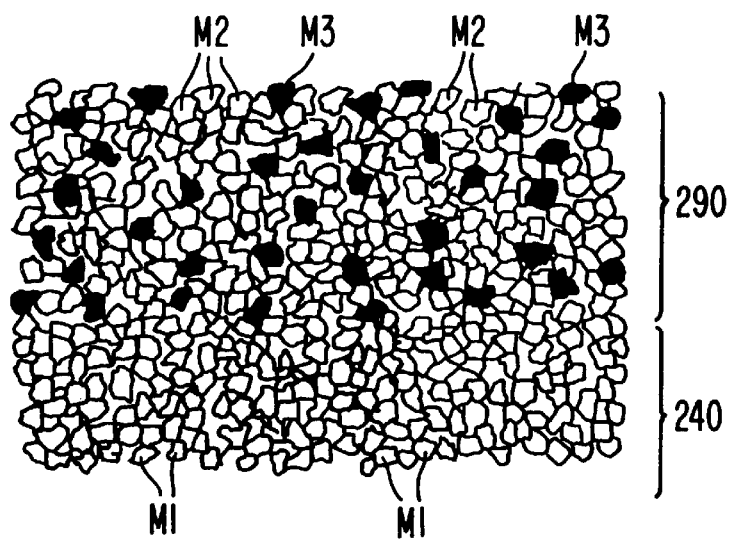
FIGS. 1(a) and 1(b) are principle illustrations of forming an underlying layer and a barrier-rib material layer according to the present invention.
Figure 1B:
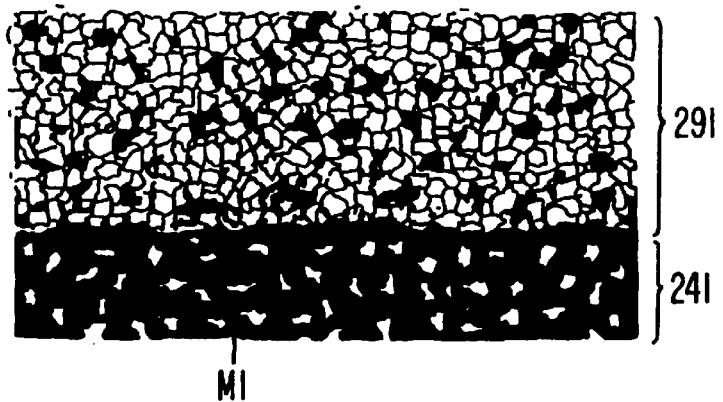

FIGS. 1(a) and 1(b) are principle illustrations of forming the underlying layer and the barrier-rib material layer according to the present invention.

The formation of the underlying layer and the barrier-rib material layer has one feature of simultaneously sintering two low-melting glass layers (glass layer 240 for the underlying layer, glass layer 290 for the barrier-rib layer) different in composition. A lamination method is best suited as a technique for sintering the layers 240 and 290 in view of evenness in thickness and operation time. However, the invention is not limited to this. In order to form a carve-resistive underlying layer and an easily-carvable barrier-rib material layer by sintering once, a combination of low-melting glasses as given below is used as each main component for the glass layer 240 and the glass layer 290. The glass layer 240 to be the underlying layer uses a first low-melting glass M1 having a softening point of a temperature A. The glass layer 290 uses a second low-melting glass M2 having a softening point of a temperature B2 higher than the temperature A and a third low-melting glass M3 having a softening point of a temperature B1 higher than the temperature A but lower than the temperature B2. The second low-melting glass M2, for example, is in a content higher than that of the third low-melting glass M3. Note that a powder of the first low-melting glass actually mixed in a vehicle (dispersion medium) may be a single composition, or a mixture of low-melting glasses different in composition. This is true for the second and third low-melting glasses M2 and M3. The softening points are in a relationship such as A<B1<(A')<B2.

The glass layer 240 and the glass layer 290 are sintered at a temperature Z within a range from the temperature A to the temperature B2, preferably at a temperature around B1 (from B1 to B1+50° C.). During this sintering, most of the first low-melting glass M1 is almost completely softened, while the glass layer 240 is turned into a compact and hard underlying layer 241 (FIG. 1(b)). In the glass layer 290, on the other hand, the second low-melting glass M2 is hardly softened, but the third low-melting glass M3 is at least partly softened. Accordingly, a comparatively insubstantial barrier-rib material layer 291 is formed of the third low-melting glass M3 thus softened joined with the second low-temperature glass M2 here and there. This barrier-rib material layer 291 is low in mechanical strength and fragile enough to be easily carved.

Incidentally, a low-melting glass (not shown) having a softening point of a temperature A' lying between the temperature B1 and the temperature B2 may be mixed in the glass layer 240 for the purpose of suppressing flow of a layer due to softening of the first low-melting glass M1. An appropriate amount of a filler may be mixed in order to suppress the flow. Also, the barrier ribs are prevented from sinking, since the underlying layer 241 is prevented from softening again during the sintering made after carving the barrier-rib material layer 291 by using the first low-melting glass M1 or a crystallizing glass as a mixture therewith.

Figure 2A:
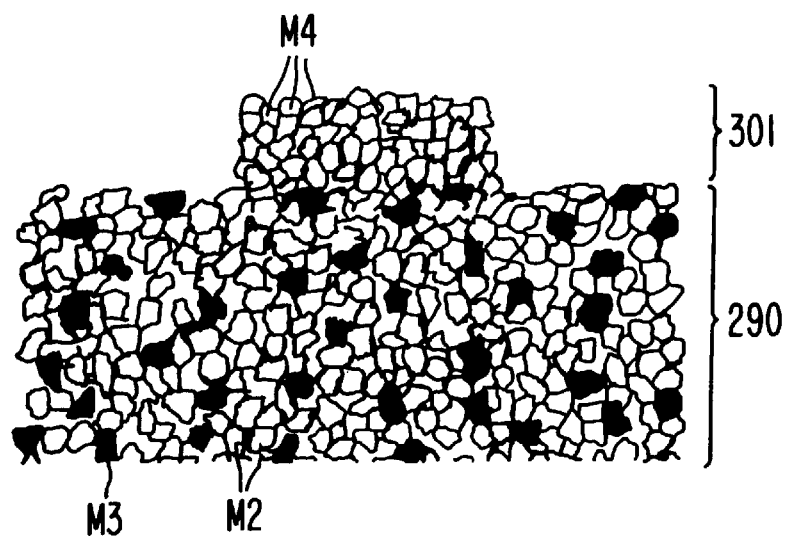
FIGS. 2(a) and 2(b) are principle illustrations of forming a barrier-rib material layer and a mask for carving according to the present invention.
Figure 2B:
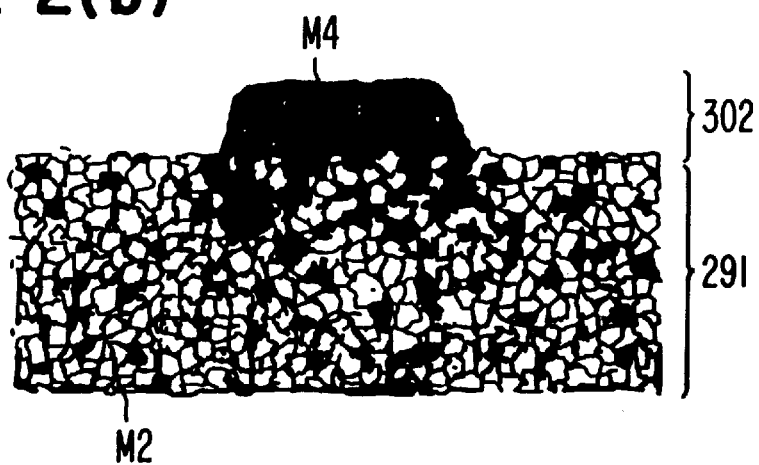

FIGS. 2(a) and 2(b) are principle illustrations of forming the barrier-rib material layer and the mask for carving according to the present invention.

The mask for carving is formed in the procedure given below, in order to eliminate the necessity of removing the mask for carving.

First, a material layer 301 for a mask is formed in a predetermined masking pattern on the glass layer 290 contained the main component for the second and third low-melting glasses M2 and M3 (FIG. 2(a)). The material layer 301 for the mask is contained the main component for a fourth low-temperature glass M4 having a softening point of a temperature C lower than the softening temperature of the low-melting glass M3. The methods of forming this involve a photolithography technique such as providing a photosensitive layer and performing exposure and development on it, a screen printing, and an application by a dispenser. The material layer 301 for the mask may be in a thickness below ⅓ of the glass layer 290, enabling screen printing with a precise pattern. The softening points are in a relationship such as C<B1<B2.

Then, the glass layer 290 and the material layer 301 for the mask are sintered at a temperature Z within a range from a temperature C to the temperature B2, preferably at a temperature around B1 (from B1 to B1+50° C.). During this sintering, the glass layer 290 is turned into an easily-carvable barrier-rib material layer 291, as stated before. Also, the fourth low-melting glass M4 is almost completely softened, and the material layer 301 for the mask is turned into a compact and hard mask 302 for carving. There may be a case that the softened fourth low-melting glass M4 infiltrates into the glass layer 290, so that the mask 302 for carving is assimilates with an upper layer portion of the barrier-rib material layer 291. The mask 302 for carving is a glassy layer where a vehicle contained in the material layer 301 for the mask is burned out, and utilizable as an upper layer portion of the barrier ribs. Therefore, there is no necessity of removing the mask 302 for carving after sand blasting the barrier-rib material layer 291, thereby eliminating breakage of the barrier ribs due to stripping away the mask. Also, the material layer 301 for the mask has a binder without requiring carve-resistance. The material layer 301 for the mask is satisfactory if fulfilling a condition that it is burnt out during sintering prior to the sand blasting, increasing the freedom to select a binder material. Note that the temperature C may be selected to a same value as the temperature A. That is, the first low-melting glass M1 and the fourth low-temperature glass M4 may be the same in composition.

Concretely, the temperature A is preferably in the range from 380° C. to 430° C. The temperature B2 is preferably higher than the temperature A by 50° C. to 120° C. The temperature B1 is not limited as long as the temperature B1 is in the range between the temperature A and the temperature B2, but preferably higher than the temperature A by 0° C. to 50° C. The temperature C is preferably lower than the temperature B1 by 0° C. to 30° C. The temperature Z is not limited as long as the temperature Z is in the range between the temperature A or C and the temperature B2, but preferably higher than the temperature B1 by 0° C. to 50° C. Incidentally, the temperatures A, B1, B2, Z and C preferably have a relationship such as A<C<B1<B2, Z=B1 to B1+50° C., and Z=A+30° C. to A+70° C.

FIGS. 3(a) and (b) are illustrated exploded perspective views showing an internal structure of a PDP 1 of the present invention, wherein FIG. 3(b) is a magnified view of FIG. 3(a).

The PDP 1 is a PDP of a surface discharge structure having pairs of parallel sustaining electrodes X and Y as first and second electrodes and address electrodes A as third electrodes arranged in perpendicular therewith, thereby forming cells C. The sustaining electrodes X and Y extend in a row direction (horizontal direction) of a screen. One sustaining electrode Y is utilized as a scanning electrode to select a cell in a row unit during addressing. The address electrode A extends in a column direction (vertical direction), and is utilized as a data electrode to select a cell C in a column unit.

The PDP 1 has a front glass substrate 11 having an internal surface on which a pair of the sustaining electrodes X, Y are arranged per each row L. The row L means an array of cells placed in the horizontal direction of the screen. The sustaining electrodes X and Y are each formed of a transparent conductive electrode film 41 and a metal film (bus conductor) 42, which are coated with a low-melting glass of a dielectric layer 17 having a thickness of approximately 30 $\mu$m. The dielectric layer 17 has, on a surface, a protecting film 18 made of magnesia (MgO) having a thickness of approximately several thousands angstroms. The address electrodes A are placed on an insulating layer 22 covering an internal surface of a rear-side glass substrate 21, and coated with a low-melting glass layer 24 having a thickness of approximately 10 $\mu$m. The low-melting glass layer 24 has thereon barrier ribs 29 in a strip form as viewed in plan having a height of 150 $\mu$m, each of which is arranged between adjacent address electrodes A. These barrier ribs 29 divide a discharge space 30 in the row direction into sub-pixels (unit luminescent areas), and define a gap dimension of the discharge space 30. Fluorescent layers 28R, 28G and 28B of three colors R, G and B of, for color display, are formed in a manner covering rear-side interior surfaces including the above of the address electrode A and lateral surfaces of the barrier ribs 29. The discharge space 30 is filled with a discharge gas based on neon mixed with xenon. The fluorescent layer 28R, 28G, 28B, during electric discharging, luminesces due to local excitation by a ultra-violet ray emitted by xenon. A displaying one pixel is structured by three sub-pixels placed in the row direction. Each sub-pixel provides a structure as a cell (display element). The barrier ribs 29 are arranged in a stripe pattern, so that the discharge space 30 on each row is continuous in the column direction and bestride all column L.

The barrier ribs 29 are formed by sand blasting, as stated later. The low-melting glass layer 24 serves both as a dielectric layer and a carve-resisting layer to protect the address electrodes A during sand blasting. That is, the low-melting glass layer 24 corresponds to the underlying layer of this invention (hereinafter, the low-melting glass layer 24 on a manufacture stage is referred to as the "underlying layer").

The PDP 1 of this structure is manufactured through a series of processes including the formation of front and rear substrate structures by providing on the respective glass substrates 11 and 21 with their own component elements, placing on both the substrate structures together to seal peripheral edges of the opposing gaps, evacuating the interior and filling with a discharge gas. During making the rear substrate structure, address electrodes A, barrier ribs 29 and fluorescent layers 28R, 28G and 28B are arranged on the glass substrate 21 in the order. Explanations will be made hereinbelow on a method of forming the barrier ribs 29.

EXAMPLES

Example 1

FIGS. 4(A) to 4(F) show process views for forming barrier ribs as an example 1, while FIGS. 5(a) and 5(b) are views showing a modification of a lamination process of FIGS. 4(A) to 4(F). In these figures, an insulating layer 22 and address electrodes A are not shown. This is true for other figures hereinafter referred to.

[A] A glass substrate 21 is first prepared which is formed with an insulating layer 22 and address electrodes A. Onto the substrate 21 is adhered a green tape (or green sheet) 83 having a glass layer 240 for an underlying layer and a glass layer 290 for a barrier-rib layer previously integrated therewith (laminating process). The green tape 83 in a roll state is supplied on a process line and it is drawn out and carved by a predetermined length (FIG. 4(A)). The laminating method is simpler to operate than printing a paste, providing an even layer thickness.

As is mentioned above, the main component for the glass layer 240 is based on a low-melting glass powder having a softening point of a temperature A. The main component for the glass layer 290 is based on a low-melting glass powder having a softening point of a temperature B2 and a low-melting glass powder having a softening point of a temperature B1 (A<B1<B2). Incidentally, two single-layer green tapes 81 and 82, in place of the multi-layered green tape 83, may be separately adhered onto the glass substrate 21 in order as shown in FIGS. 5(a) and 5(b), so that the glass layer 240 and the glass layer 290 are formed on the glass substrate 21.

[B] The substrate 21 thus processed is heated up to a set temperature at around the temperature B1 to burn out a vehicle content of the glass layer 240 and the glass layer 290 (presintering). This provides a compact, hard and carve-resistive underlying layer 241 and a filmy barrier-rib material layer 291 that is easy to carve (FIG. 4(B)). The temperature of this sintering is lower than that of a final sintering stated later, and requires a shorter time of heating and cooling than that of the final sintering. That is, it is possible to reduce a total required time as compared with the conventional method requiring sintering underlying layer.

[C] A photosensitive dry film is adhered onto the barrier-rib material layer 291, or a resist material is applied thereto. A series of photolithography processes, involving exposure and development, are carried out to form a mask 70 for carving having a mask pattern corresponding to a pattern of barrier ribs 29 (stripe pattern in example 1) (FIG. 4(C)). The underling layer 241, the barrier-rib material layer 291 and the mask 70 for carving thus obtained constitute a layered structure 201 of the present invention.

[D] Performing sand blasting to carve the unmasked portions of the barrier-rib material layer 291 until the glass layer 240 is exposed (FIG. 4(D)).

[E] Infiltrating an alkali solution into the mask 70 for carving for swelling, to strip away the mask 70 for carving from the patterned barrier-rib material layer 292 (FIG. 4(E)).

[F] Heating up to a temperature around the temperature B2 higher than the temperature of the presintering, the barrier-rib material layer 292 is sintered into a barrier ribs 29. At this time, the low-melting glass is softened that has not been softened during the presintering. Thus, the barrier ribs 29 is turned into a hard structure (FIG. 4(F)).

Example 2

Figure 7A:
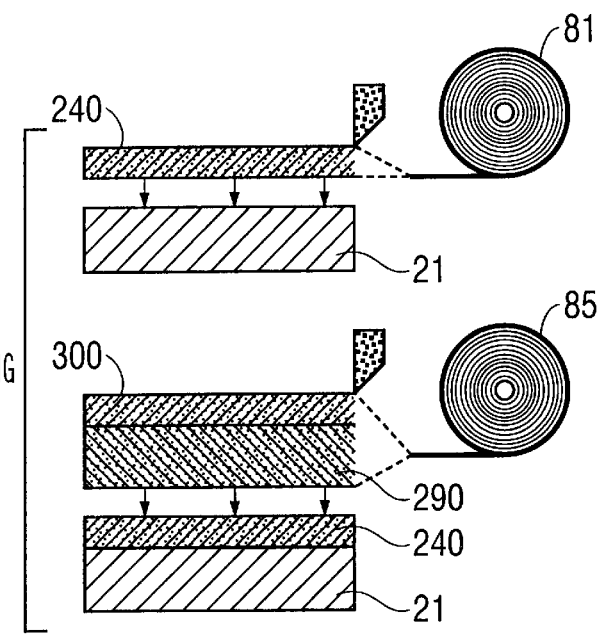
Figure 8A:
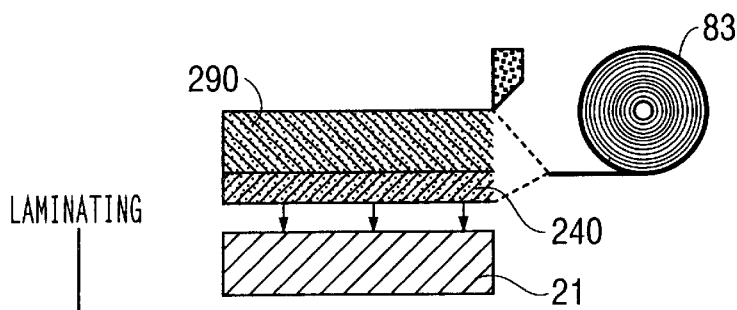
FIGS. 8(a) and 8(b) are views showing a modification of a process for forming a layered structure of FIGS. 6(A) to 6(E).
Figure 8B:
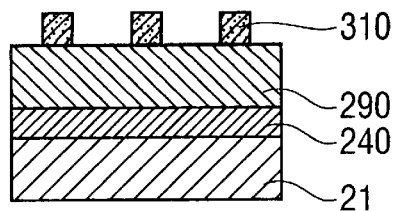

FIGS. 6(A) to 6(E) are process views for forming barrier ribs according to an example 2. FIGS. 7(a) and 7(b) are views showing a modification of a lamination process of FIGS. 6(A) to 6(E). FIGS. 8(a) and 8(b) are views showing another modification of the lamination process of FIGS. 6(A) to 6(E).

[A] A green tape 84, previously integrated with a glass layer 240 for an underlying layer, a glass layer 290 for a barrier-rib layer and a mask-forming layer 300, is adhered onto a glass substrate 21 formed with an insulating layer 22 and address electrodes A (laminating process) (FIG. 6(A)).

The main component for the glass layer 240 is based on a low-melting glass powder having a softening temperature point A. The main component for the glass layer 290 is based on a low-melting glass powder having a softening temperature point B2 and a low-melting glass powder having a softening temperature point B1 (A<B1<B2). The main component for the mask-forming layer 300 is based on a low-melting glass powder having a softening point lower than a temperature C (C<B1<B2), and dispersed in a vehicle based on a photosensitive binder. That is, the mask-forming layer 300 is formed of a photosensitive paste.

Incidentally, three single-layer green tapes, in place of the triple-layer green tape 84, may be adhered, in order, onto the glass substrate. Alternatively, as shown in FIGS. 7(a) and 7(b), a single-layer green tape 81 may be first adhered onto a glass substrate 21 to provide a glass layer 240, and then a double-layer green tape 85 be adhered onto, thereby providing a glass layer 290 for a barrier-rib layer and a mask-forming layer 300 on the glass substrate 21.

[B] The mask-forming layer 300 is exposed and developed for patterning to form a material layer 301 for a mask having a mask pattern corresponding to that of a barrier ribs 29 (FIG. 6(B)).

[C] The glass layer 240, the glass layer 290, and the material layer 301 for the mask are heated up to a temperature around the temperature B1, and burned out of vehicle (presintering). This provides a carve-resistive underlying layer 241 formed compact and hard, a filmy barrier-rib material layer 291 formed easy to carve, and a carve-resistive mask 302 that is compact and hard. The glass layer 240, the barrier-rib material layer 291 and the mask 302 for carving thus formed constitute a layered structure 202 of example 2.

Incidentally, if a bright-colored pigment is added to the glass layer 290 and a dark-colored pigment is added to the mask-forming layer 300, the reflectivity of light is enhanced that contributes to displaying to improve the brightness. The contrast is also increased by reducing external light reflection on the barrier ribs 29 and light leak to adjacent cells.

[D] Sand blasting is carried out to carve the unmasked portions of the barrier-rib material layer 291 until the glass layer 240 is exposed (FIG. 6(D)).

[E] The patterned barrier-rib material layer 292 is sintered, with the mask 302 for carving left, by heating up to a set temperature (about 450° C.) around the temperature B2 higher than the temperature in presintering. Thus barrier ribs 29 are formed. The mask 302 for carving is turned into part (upper layered portion) of the barrier ribs 29 (FIG. 6(E)).

Incidentally, as shown in FIGS. 8(a) and 8(b), a method including a process of adhering a green tape 83 may be utilized in place of the above process of photolithgraphically patterning the photosensitive mask-forming layer 300. That is, a glass layer 240 for an underlying layer and a glass layer 290 for a barrier-rib layer are provided by using the green tape 83, and then a non-photosensitive low-melting glass paste is applied on a predetermined pattern by a screen-printing method or a dispenser-applying method, thus providing a material layer 310 for a mask. With this process, exposure and development are unnecessary, simplifying the line and process of manufacture.

In the above examples, in the case the material is not required to have photosensitivity may be used the material having a flit (inorganic solid fine powder), containing 30–100 percent by volume of a low-melting glass and 70–0 percent by volume of a filler (refractory oxide), dispersed in a vehicle having a binder, containing 40–60 percent by volume of a resin and 60–40 percent by volume of a plasticizer, dissolved in an organic solvent. Where using a sheet(or tape), a green sheet (or green tape) may be used that is obtained by applying a prepared material onto a carrier member, such as a polyethylene film or a Mylar film, surface-treated such as by silica-coating, and removing an organic solvent from the material. The glass layer of the present invention includes, for example, a layer formed in a green tape, and is not limited to a printed material layer containing an organic solvent mixed therein. The glass layer may be formed by an applying technique such as green tape adhesion, screen printing and roll coating. The compositions of the materials are exemplified below. Note that other materials may be employed without limitation to the exemplification provided that they are adapted for the principle of the present invention. Incidentally, there is Japanese Unexamined Patent Publication No. Hei 8(1996)-255510 disclosing in detail as to a green tape material having a low-melting glass flit dispersed in a tape material. In the present invention, importance is placed on the softening point and amount of the low-melting glass, as well as the relationship in softening characteristics between a plurality of the glass layers. The materials used for forming a sheet may be conformable to the known examples.

(1) Low-melting glass:

The low-melting glass is generally contained lead oxide (PbO) as the main component. The softening point as a glass material is controllable principally by the content of lead oxide (the softening point lowers if the content increases) and the amount of additives (In, Sb, etc.). As for the low-melting glass, may employ a glass powder having a composition of $SiO_2$: 1–20 wt %, $B_2O_3$: 5–25 wt %, $Al_2O_3$: 0–8 wt %, ZnO: 3–15 wt %, PbO: 60–80 wt %, and other additives.

(2) Filler:

$Al_2O_3$, $SiO_2$, etc. may be listed.

(3) Resin:

The resins as stated before are used as a binder wherein the resin is dissolved in an organic solvent. The resin serves to bind a flit before the low-melting glass begins to melt in the case of making a green tape. The resin has to be burned out when the low-melting glass melts and flits are melted and bound each other. It is preferred that the resin is formed of a material easy to burn at a temperature below 400° C., because the low-melting glass in general begins to soften at a temperature of approximately 400° C. The material like this is listed for example as: poly(vinyl butyral), poly(vinyl acetate), poly(vinyl alcohol), cellulose-based polymer such as methyl cellulose, ethyl cellulose and hydroxyl cellulose, atactic polypropylene, polyethylene, silicon-based polymer such as poly(methyl siloxane) and poly(methylphenyl siloxane), polystyrene, butadiene/styrene copolymer, poly (vinyl pyrrolidone), polyamide, high-molecular weight polyether, copolymer of ethylene oxide and propylene oxide, polyacrylamide, sodium polyacrylate, poly(lower alkylacrylate), copolymer of lower alkylacrylate and methacrylate, and various acrylic polymers.

(4) Plasticizer:

The plasticizer permeates between resin molecules and serves to reduce the intermolecular force and causes molecular chains of the resin to easily move. The plasticizer contributes to lower the glass transition point, and acts to enhance the flexibility and flowability of the material. The material like this is listed for example as: diethylphthalate, dibutylphthalate, butylbenzylphthalate, dibenzylphthalate, alkylphosphate, polyalkylene glycol, poly(ethylene oxide), hydroxyethyl substituted alkylphenol, tricresylphosphate, triethylene glycol diacetate and polyester plasticizer.

(5) Organic solvent:

The organic solvent has to posses an ability to dissolve both the resin and the plasticizer, and is preferably volatilized at a comparatively low temperature in view of the tape process operationality. The material like this is listed for example as: acetone, xylene, methanol, ethanol, isopropanol, methylethylketone, tetrachloroethylene, amylacetate, 2,2,4-triethyl pentandiol-1,3-monoisobutylate, toluene, methylene chloride, fluorocarbon, butyl carbitol acetate, and α-terpineol.

The material having a photosensitivity uses, for example, a paste material having a flit (1–99 parts by weight) having 1–100 parts by weight of a low-melting glass and 99–0 parts by weight of a filler, dispersed in a vehicle having 1–99 parts by weight of a photosensitive resin (base polymer, photopolymerizable unsaturated compound, polymerization initiator, etc.) dissolved in an organic solvent. In particular, using as a sheet-formed material, a green tape can be used that is obtained by applying a prepared material onto a carrier member such as a polyethylene film or a Mylar film surface-treated such as silica-coating and then removing off the organic solvent content. Incidentally, there are many prior arts (e.g. Japanese Unexamined Patent Publication No. Hei 8(1996)-95239) disclosing as to a photosensitive fluorescent tape material used for the fluorescent layers 28R, 28G and 28B. The photosensitive material, used in implementation of the present invention, conforms to the prior art, except that it is based on a low-melting glass instead of fluorescent material powder.

(1) Low-melting glass:

Same as the case of the materials not requiring photosensitivity.

(2) Filler:

Same as the case of the materials not requiring photosensitivity.

(3) Photosensitive resin:

The photosensitive resin is formed of a base polymer, a photopolymerizable unsaturated compound, a potopolymerization initiator, etc. The photosensitive resin has a composition ratio, as an example, of 10–200 parts by weight of a photopolymerizable unsaturated compound and 1–60 parts by weight of a potopolymerization initiator to 100 parts by weight of a base polymer.

(3a) Base polymer:

Acrylic resin, polyester resin, polyurethane resin, etc. Particularly, an acrylic copolymer as the main component is preferred, which is base on (meth)acrylate, as required, copolymerized with unsaturated (ethylene-substituted) carboxylic acid or other monomers capable of copolymerization.

(3b) Photopolymerizable unsaturated compound:

Photopolmerizable multifunctional monomers, such as an unsaturated (ethylene-substituted) compound which has at an end an unsaturated (ethylene) group can be used. For example, polyethylene glycol dimethacrylate, etc. can be listed.

(3c) Photopolymerization initiator:

Benzophenone (inducing radicals by activation light), etc. can be listed.

(3d) Others:

Besides the materials involving in photosensitivity, it is possible to add, as required, dyes, color formers, plasticizers, pigments, polymerization inhibitors, surface modifying agents, stabilizers, adhesion-giving agents, thermosetting agents, etc.

Although the PDP was exemplified in the above-stated example, the present invention is also applicable to the formation of barrier ribs for other display panels than the PDP.

According to the present invention, it is possible to reduce the total time required for forming barrier ribs on the carve-resistive underlying layer by using the sand blasting method, as compared to the conventional process.

Also, according to the present invention, it is possible to provide an even thickness of the barrier-rib material layer, and form barrier ribs through only twice sintering processes.

Further, according to the present invention, the removal of the mask for carving is unnecessary, greatly reducing the possibility of breaking barrier ribs. In addition, it is possible to carry out sintering only once prior to the carving process, enabling omission of sintering after carving.

What is claimed is:

1. A method of forming barrier ribs for a display panel, comprising the steps of: forming a glass layer for an underlying layer having a first low-melting glass powder with a softening point of a temperature A dispersed in a vehicle, and a glass layer for a barrier-rib layer having a second low-melting glass powder with a softening point of a temperature B2 higher than the temperature A and a third low-melting glass powder with a softening point of a temperature B1 higher than the temperature A but lower than the temperature B2 dispersed in a vehicle, on a substrate in this order;

heating up to sinter the glass layer for the underlying layer and the glass layer for the barrier-rib layer at a temperature Z higher than the temperature A but lower than the temperature B2, thereby burning out the vehicles therefrom, forming a carve-resistive underlying layer and a barrier-rib material layer easy to carve;

forming a mask for carving in a pattern corresponding in plan to barrier ribs on the barrier-rib material layer, carving part of the barrier-rib material layer by a sand blasting method, and thereby forming barrier ribs for dividing a display area.

2. The method of forming barrier ribs for a display panel according to claim 1, wherein a content of the second low-melting glass powder is higher than that of the third low-melting glass powder.

3. The method of forming barrier ribs for a display panel according to claim 1, the glass layer for the underlying layer and the glass layer for the barrier-rib layer are provided by adhering a green sheet onto the substrate.

4. The method of forming barrier ribs for a display panel according to claim 3, the glass layer for the underlying layer and the glass layer for the barrier-rib layer are simultaneously provided by adhering a multi-layer structure of a green sheet onto the substrate.

5. A method of forming barrier ribs for a display panel, comprising the steps of: forming a glass layer for an underlying layer having a first low-melting glass powder with a softening point of a temperature A dispersed in a vehicle, a glass layer for a barrier-rib layer having a second low-melting glass powder with a softening point of a temperature B2 higher than the temperature A and a third low-melting glass powder with a softening point of a temperature B1 higher than the temperature A but lower than the temperature B2 dispersed in a vehicle, and a material layer for a mask formed in a pattern corresponding in plan to barrier ribs and having a forth low-melting glass powder with a softening point of a temperature C lower than the temperature B1 dispersed in a vehicle, on a substrate in this order;

heating up to sinter on the glass layer for the underlying layer, the glass layer for the barrier-rib layer and the material layer for the mask at a temperature Z higher than both the temperature A and the temperature C but lower than the temperature B2, thereby burning out the vehicles therefrom, forming a carve-resistive underlying layer, a barrier-rib material layer easy to carve and a mask for carving;

carving part of the barrier-rib material layer by a sand blasting method, and thereby forming barrier ribs for dividing a display area.

6. The method of forming barrier ribs for a display panel according to claim 5, a content of the second low-melting glass powder in the glass layer for the barrier-rib layer is higher than that of the third low-melting glass powder.

7. The method of forming barrier ribs for a display panel according to claim 5, the material layer for the mask is formed by providing a material for making the material layer for the mask on the glass layer for the barrier-rib layer, thereby forming a mask-forming layer, and then removing part of the mask-forming layer by a photolithography method.

8. The method of forming barrier ribs for a display panel according to claim 7, glass layer for the underlying layer, the glass layer for the barrier-rib layer and the mask-forming layer are formed on the substrate by adhering a green sheet including materials forming respective layers thereof.

9. The method of forming barrier ribs for a display panel according to claim 8, the glass layer for the barrier-rib layer and the mask-forming layer are simultaneously formed on the substrate by adhering a layered-structure of a green sheet including materials forming the respective layers.

10. The method of forming barrier ribs for a display panel according to claim 8, the glass layer for the underlying layer, the glass layer for the barrier-rib layer and the mask-forming layer are simultaneously formed on the substrate by adhering a layered-structure of a green sheet including materials forming the respective layers.

11. The method of forming barrier ribs for a display panel according to claim 5, wherein the material layer for the mask is formed by providing the glass layer for the underlying layer and the glass layer for the barrier-rib layer on the substrate, and then applying a mask-forming material dispersed with a fourth low-melting glass powder with a softening point of a temperature C lower than the temperature B1 in the pattern of plan onto the glass layer for the barrier-rib layer.

* * * * *